United States Patent
Hammes et al.

(10) Patent No.: US 12,290,939 B2
(45) Date of Patent: May 6, 2025

(54) SENSOR ARRANGEMENT AND METHOD FOR SAFEGUARDING A MONITORED ZONE

(71) Applicant: SICK AG, Waldkirch (DE)

(72) Inventors: Markus Hammes, Waldkirch (DE); Nicolas Löffler, Waldkirch (DE)

(73) Assignee: SICK AG, Waldkirch (DE)

( * ) Notice: Subject to any disclaimer, the term of this patent is extended or adjusted under 35 U.S.C. 154(b) by 219 days.

(21) Appl. No.: 17/879,555

(22) Filed: Aug. 2, 2022

(65) Prior Publication Data
US 2023/0081003 A1 Mar. 16, 2023

(30) Foreign Application Priority Data
Aug. 3, 2021 (EP) .................................. 21189252

(51) Int. Cl.
*B25J 9/16* (2006.01)
*B25J 13/08* (2006.01)
(Continued)

(52) U.S. Cl.
CPC .............. *B25J 9/1676* (2013.01); *B25J 13/08* (2013.01); *G01S 13/867* (2013.01); *G01S 13/88* (2013.01);
(Continued)

(58) Field of Classification Search
CPC ....... B25J 9/1676; B25J 13/08; G01S 13/867; G01S 13/88; G06T 7/248; G06T 2200/04;
(Continued)

(56) References Cited

U.S. PATENT DOCUMENTS

| 2015/0294496 A1 | 10/2015 | Medasani et al. |
| 2016/0104046 A1* | 4/2016 | Doettling ............... F16M 13/02 |
| | | 382/103 |

(Continued)

FOREIGN PATENT DOCUMENTS

| DE | 202018103869 U1 * | 11/2019 |
| EP | 3611422 A1 | 2/2020 |
| EP | 3715065 A1 | 9/2020 |

OTHER PUBLICATIONS

Malm, et al., "Dynamic safety system for collaboration of operators and industrial robots", Open Eng., vol. 9, pp. 61-71, 2019.

*Primary Examiner* — David A Testardi
(74) *Attorney, Agent, or Firm* — Nath, Goldberg & Meyer; Jerald L. Meyer; Ilirian Durri

(57) ABSTRACT

The invention relates to a sensor arrangement and to a method for safeguarding a monitored zone at a machine. The sensor arrangement comprises a camera continuously generating 3D images, a control and evaluation unit for the position detection of objects in the monitored zone and, in the case of a hazardous position, initiating a safety-directed response of the machine, with a buffer memory unit being provided for storing last recorded images and with a 3D reference map being prepared from the stored images when the safety-directed response was initiated, a voxel identification unit being provided for flagging those voxels in the current 3D image whose coordinates differ by a specified distance from those of the corresponding voxels of the reference map, a movement recognition unit being provided in which the voxels thus identified are examined as to whether they display position changes that are above a fixed threshold in the course of a fixed number of further current images, and independently thereof, a restart signal for the machine being able to be output at an output.

15 Claims, 3 Drawing Sheets

Figure 1:
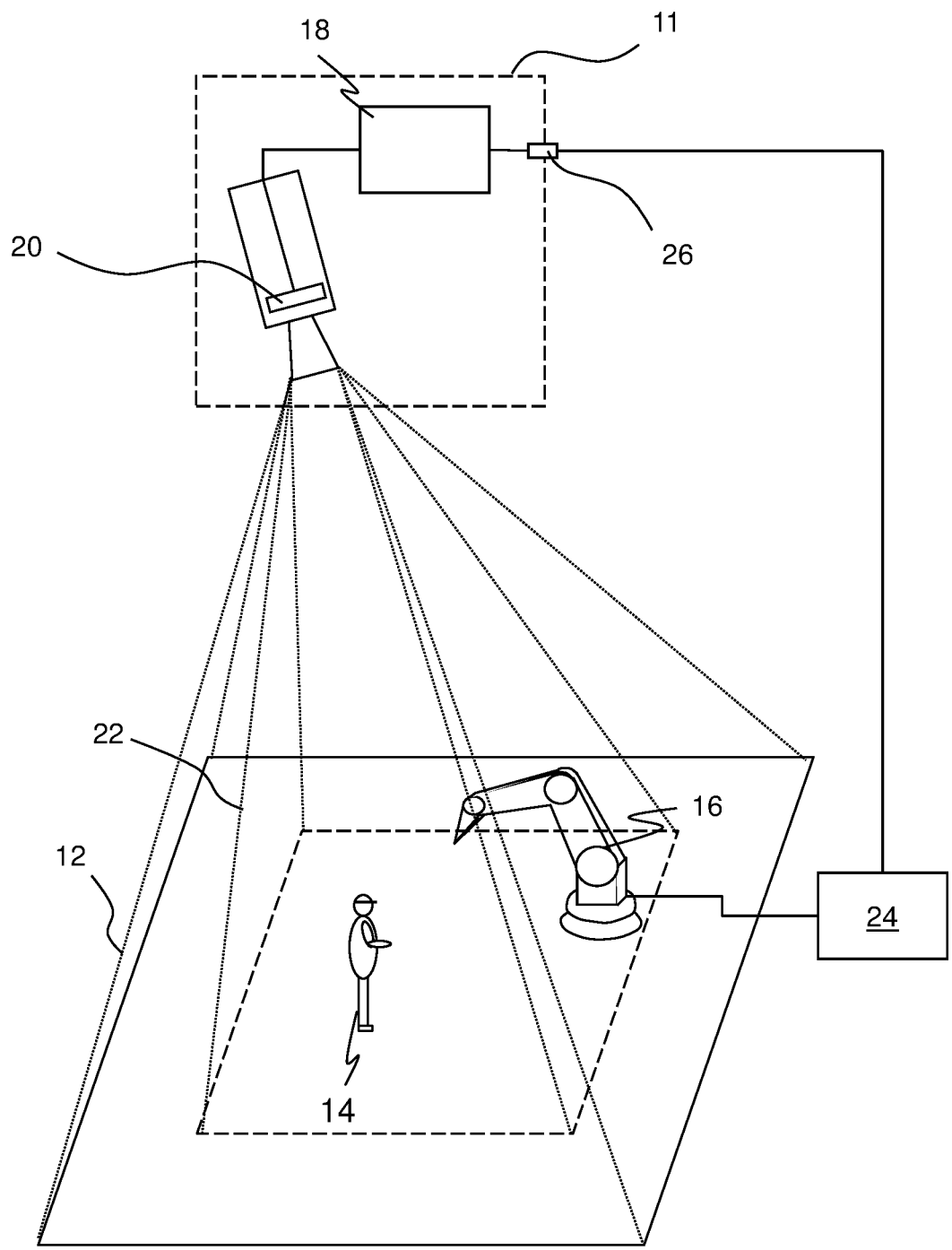

(51) Int. Cl.
  *G01S 13/86* (2006.01)
  *G01S 13/88* (2006.01)
  *G06T 7/246* (2017.01)
  *G06V 20/52* (2022.01)
  *H04N 5/77* (2006.01)
  *H04N 7/18* (2006.01)

(52) U.S. Cl.
  CPC .............. *G06T 7/248* (2017.01); *G06V 20/52* (2022.01); *H04N 5/77* (2013.01); *H04N 7/183* (2013.01); *G06T 2200/04* (2013.01); *G06T 2207/10012* (2013.01); *G06T 2207/10028* (2013.01); *G06T 2207/30196* (2013.01); *G06T 2207/30232* (2013.01)

(58) Field of Classification Search
  CPC . G06T 2207/10012; G06T 2207/10028; G06T 2207/30196; G06T 2207/30232; G06T 2207/10016; G06T 7/20; G06T 7/70; G06T 7/50; G06V 20/52; H04N 5/77; H04N 7/183; G05B 2219/40201; G05B 2219/40442; G05B 2219/49141; G05B 2219/49143; G05B 19/4061
  See application file for complete search history.

(56) References Cited

U.S. PATENT DOCUMENTS

| | | | |
|---|---|---|---|
| 2019/0007659 A1* | 1/2019 | Neubauer | G01B 11/14 |
| 2019/0118381 A1* | 4/2019 | Kikkeri | G06T 7/0004 |
| 2019/0362487 A1* | 11/2019 | Braune | G06V 20/52 |
| 2019/0377322 A1* | 12/2019 | Hornung | G06T 7/80 |
| 2019/0378264 A1* | 12/2019 | Braune | G06V 20/52 |
| 2020/0011656 A1* | 1/2020 | Hornung | G01S 17/88 |
| 2020/0056742 A1* | 2/2020 | Böhning | G01V 8/20 |
| 2020/0122323 A1* | 4/2020 | Inaba | B25J 9/1694 |
| 2020/0189103 A1* | 6/2020 | D'Ercoli | B25J 9/1666 |
| 2025/0001603 A1* | 1/2025 | Behrens | B25J 9/1676 |
| 2025/0022160 A1* | 1/2025 | Meglan | G06T 7/70 |

* cited by examiner

SENSOR ARRANGEMENT AND METHOD FOR SAFEGUARDING A MONITORED ZONE

The invention relates to a sensor arrangement and to a method for safeguarding a monitored zone.

The primary goal of safety engineering is to protect persons from hazard sources such as, for example, machines in an industrial environment represent. The machine is monitored with the aid of sensors and accordingly, if a situation is present in which a person threatens to come dangerously close to the machine, a suitable safeguarding measure is taken.

3D sensors are inter alia used for the monitoring. They first include 3D cameras in different technologies, for example stereoscopy, triangulation, time of flight, or evaluation of the interference of passive two-dimensional patterns or of projected illumination patterns. Such 3D sensors, in contrast to a conventional two-dimensional camera, record images that include a distance value in their pixels. These depth-resolved or three-dimensional image data are also called a depth map.

Sensors used in safety technology or for the protection of persons have to work particularly reliably and must therefore satisfy high safety demands, for example the standard EN13849 for safety of machinery and the machinery standard IEC61496 or EN61496 for electrosensitive protective equipment (ESPE) or IEC61508. To satisfy these safety standards, a series of measures have to be taken such as a safe electronic evaluation by redundant, diverse electronics, functional monitoring or special monitoring of the contamination of optical components.

The common safeguarding concept provides that protected zones are configured that may not be entered by operators during the operation of the machine. If the sensor recognizes an unauthorized intrusion into the protected zones, for instance a body of a worker, it triggers a safety-directed stop of the machine. In some cases, additional warning zones are positioned in front of the protected zones to prevent a person from a protected zone infringement in good time or to reduce the working speed of the machine as a precaution. Protected zones have to be configured as relatively large to satisfy all conceivable cases so that a system response that reduces productivity occurs at a comparatively early time.

Protected zones limit cooperation with machines, in particular with robots (HRC, human robot collaboration). Relevant standards in this connection are, for example, ISO 10218 for industrial robots or ISO 15066 for collaborative robots. Safety distances should be configured as small as possible in HRC and possibly even in a situation-adapted manner, naturally with the proviso that safety is maintained. Standards ISO 13854, ISO 13855, and ISO 13857 deal with the establishment of safety distances.

One problem in these safety arrangements is the restart of the hazardous machine (e.g. an industrial robot) after a safety-directed shutdown. A restart should take place as fast as possible and preferably automatically to save valuable production time, that is to increase the availability of the machine. To achieve a productivity of a plant or machine that is as high as possible, all unnecessary manual interventions should be avoided. The restart of a machine after it had been stopped by a safety intervention is a special case in this sense. A manual reset of the protective equipment is necessary in many applications. The machine can only continue to be operated when a person on site has satisfied himself that the hazardous zone is free of persons and releases the machine manually, for example using a reset button.

This additional effort has to be made because, for example, parts of the hazardous zone cannot be seen by the sensor or because positions and orientations of objects have been changed during the machine stop that could not be distinguished from a person for a simple protected zone function (e.g. a pallet that has been brought in or moved that is irrelevant with respect to safety). This necessary evil of the manual restart is currently accepted because no satisfactory technical solutions for an automatic restart have been present to date.

Such a manual restart restricts the productivity of a machine or plant in that a person always has to be on hand to instigate the restart. If the person can only arrive at the machine with a delay after the safety intervention, the machine stands still in this time.

It is therefore the object of the invention to improve the monitoring of a machine such that the availability is increased and in particular such that a restart is improved, such that time can be saved and the restart can in particular run in an automated manner.

This object is satisfied by a sensor arrangement and by a method for safeguarding a monitored zone at a machine in accordance with the respective independent claim.

A monitored zone in the sense of the present invention is typically a spatial zone in which there is a potential risk of life and limb for a person, with the hazard emanating from the machine. The machine itself and its work zone thus form a hazard site. Persons may not dwell in the monitored zone because otherwise the risk that an accident may occur is too large. A monitored zone can also be a sluice region or a passage region a person has to pass through to enter into a hazardous zone. A mobile robot such as an automated guided vehicle (AGV) can also pass through this sluice region.

At least one 3D camera continuously detects objects in the monitored zone and generates 3D images of the monitored zone. Various technologies are known for a 3D camera such as time of flight principle with a direct time of flight measurement of light signals or a phase measurement or a distance estimate from brightness levels or focal positions (depth from focus, depth from defocus) or a triangulation principle in which two camera images of a moving camera or of a stereo camera are correlated with one another or alternatively an illumination pattern is correlated with a camera image to thus estimate disparities and to determine distances therefrom. The camera is preferably configured as failsafe, that is, it is designed for a safety engineering application and satisfies the standards named in the introduction or corresponding standards to safeguard a hazardous machine.

A control and evaluation unit evaluates the 3D images and determines the presence or positions of the detected objects, in particular from the received signal of a light receiver of the 3D camera. If the instantaneous position is accordingly evaluated as dangerous, for instance because an object is in the monitored zone at all and/or comes too close to a hazard zone, a safety-related response of the machine is initiated. The control and evaluation unit here designates analog circuits or digital evaluation modules of the 3D camera itself or of other devices of the sensor arrangement. A minimal configuration of the sensor arrangement is accordingly a single 3D camera sensor having an internal control and evaluation unit.

The heart of the invention is a restart function after a triggering of a safety-directed response of the machine, for example a shutdown. A buffer memory unit is provided for this purpose in which a certain number of last recorded 3D images is stored. The buffer memory unit can be configured, for example, in the manner of a ring memory. If the safety-directed response was now initiated, a 3D reference map of the monitored zone is prepared from the stored images in the control and evaluation unit. The situation is thus recorded so-to-say directly before the safety-directed shutdown. 3D images then continue to be recorded and in a voxel identification unit those voxels are identified or flagged whose coordinates differ by a specified distance from those of the corresponding voxels of the reference map. Those objects are thus identified whose positions still change after the safety-directed response. Only those objects have to be further evaluated since all the other zones or objects in the monitored zone are static and thus permitted in the monitored zone because they have not led to the safety-directed response. In a movement recognition unit, the previously identified voxels are then examined as to whether they display position changes that are above a fixed threshold in the course of a fixed number of further current images. It is therefore thus determined whether the objects or at least part regions of the objects move. A distinction between static objects and persons thus becomes possible. This is therefore a person recognition. If it is found that a person is not present or is no longer present in the monitored zone; the machine can be restarted without risk. A restart signal for the machine is output at an output for this purpose.

In the embodiment in accordance with the invention, the 3D data make the safe detection of persons possible with the aid of very small movements that a human permanently carries out due to breathing movements, small weight shifts, or the like. Such small movements are also called micromovements in this application. A person detection taking place in this manner is integrated in the sensor arrangement in addition to the failsafe basic function of unpermitted objects in the monitored zone.

The most important special feature of this new person detection function is that a distinction can be made between static objects and persons. The special advantage is associated with this that substantial time can be saved by the automatic restart only made possible by the invention and the availability is thus increased to achieve the greatest possible productivity of a plant or machine. All unnecessary manual interventions are avoided.

The method in accordance with the invention can be further developed in a similar manner and shows similar advantages in so doing. Such advantageous features are described in an exemplary, but not exclusive manner in the subordinate claims dependent on the independent claims.

In an advantageous embodiment of the invention, the threshold for the movement recognition is 10 mm. This value is a compromise between the possible resolution of the 3D camera that should be as coarse as possible so that the camera can remain inexpensive and the desire of a recognition of very small movements, for example body movements caused by breathing.

In addition to the restart signal, in a further development of the invention, a person recognition signal can be output if the movement recognition unit has recognized a person, that is has recognized movements that are above the fixed threshold.

To increase the robustness with respect to pixel noise, it may be sensible that the absolute values of the position changes of an identified voxel from image to image are summed in the movement recognition unit and that the threshold is a fixedly stored voxel threshold to output the movement recognition signal (person recognition signal) and/or to suppress the restart signal if the sum of the absolute values of the position changes is above the voxel threshold. Every change in the position value of a voxel thus does not immediately result in a movement recognition, but rather only a sufficiently frequent occurrence of position changes.

For simplification, it may further be sensible that the absolute values of the position changes of all the identified voxels from image to image are summed in the movement recognition unit and that the threshold is a fixedly stored sum threshold to output the movement recognition signal (person recognition signal) and/or to suppress the restart signal if the sum of the absolute values of the position changes is above the sum threshold. This sum consideration has the advantage that very small position changes, for example of only a single voxel, are not already recognized as a movement, a plurality of voxels (that is the sum) must rather "recognize" the movement.

In a further embodiment of the invention, the voxel identification is simplified when the 3D camera is configured to detect an additional optical feature, e.g. color, brightness, reflectivity, that serves as an additional criterion for identifying the voxels in the voxel identification unit. The absolute positions of the voxels with respect to a configured protected volume can furthermore be evaluated as an additional feature. The robustness can thereby be improved since it is sufficient if the analysis of micromovements is only carried out where the configured protected volume is infringed.

The buffer memory unit, the voxel identification unit, and the movement recognition unit are advantageously parts of the control and evaluation unit. This not only shortens the signal distances, but also increases the compactness.

The sensor arrangement preferably has a safety control in which at least some of the control and evaluation unit is implemented. The control and evaluation functionality is thus divided into an internal portion within the 3D camera and an external portion in the safety control. Both extremes with a fully autonomous 3D camera that has this functionality itself and only outputs the safety-directed signal or with a 3D camera only delivering raw measured signals are conceivable.

The sensor arrangement preferably comprises an additional sensor, in particular a radar sensor that detects movements of objects in the monitored zone. Safety can thereby be increased, namely in that a further sensor having a different measurement technology likewise carries out a movement recognition. A radar sensor has the disadvantage, however, that it cannot deliver any position determination, which is, however, of no significance here since the position determination already takes place with the 3D camera. The radar sensor only serves an increase of safety in that it carried out the decisive function of the movement recognition redundantly and diversely.

The control and evaluation unit is advantageously configured as failsafe.

Provision is made in a further development of the invention that the variable N in the buffer memory unit is equal to 10 or more. This is a sensible compromise between a fast storage of as few images as possible and an accuracy of the reference map due to as many images as possible.

The continuous detection of 3D images advantageously takes place in a fixe time pattern.

Figure 2:
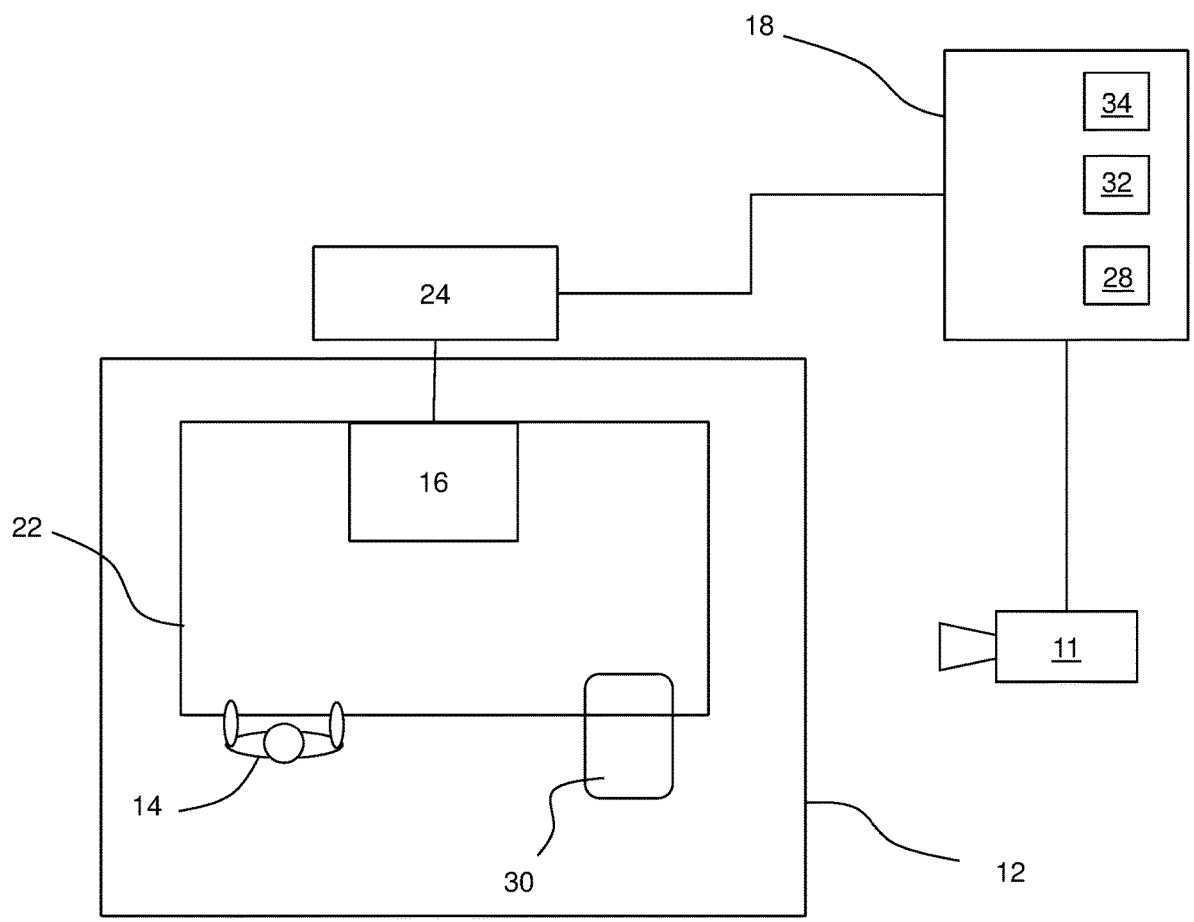

The invention will be explained in more detail in the following also with respect to further features and advantages by way of example with reference to embodiments and to the enclosed drawing. The Figures of the drawing show in:

FIG. 1 a schematic three-dimensional representation of a 3D camera and its monitored zone;

FIG. 2 a schematic representation of the monitoring; and

Figure 3:
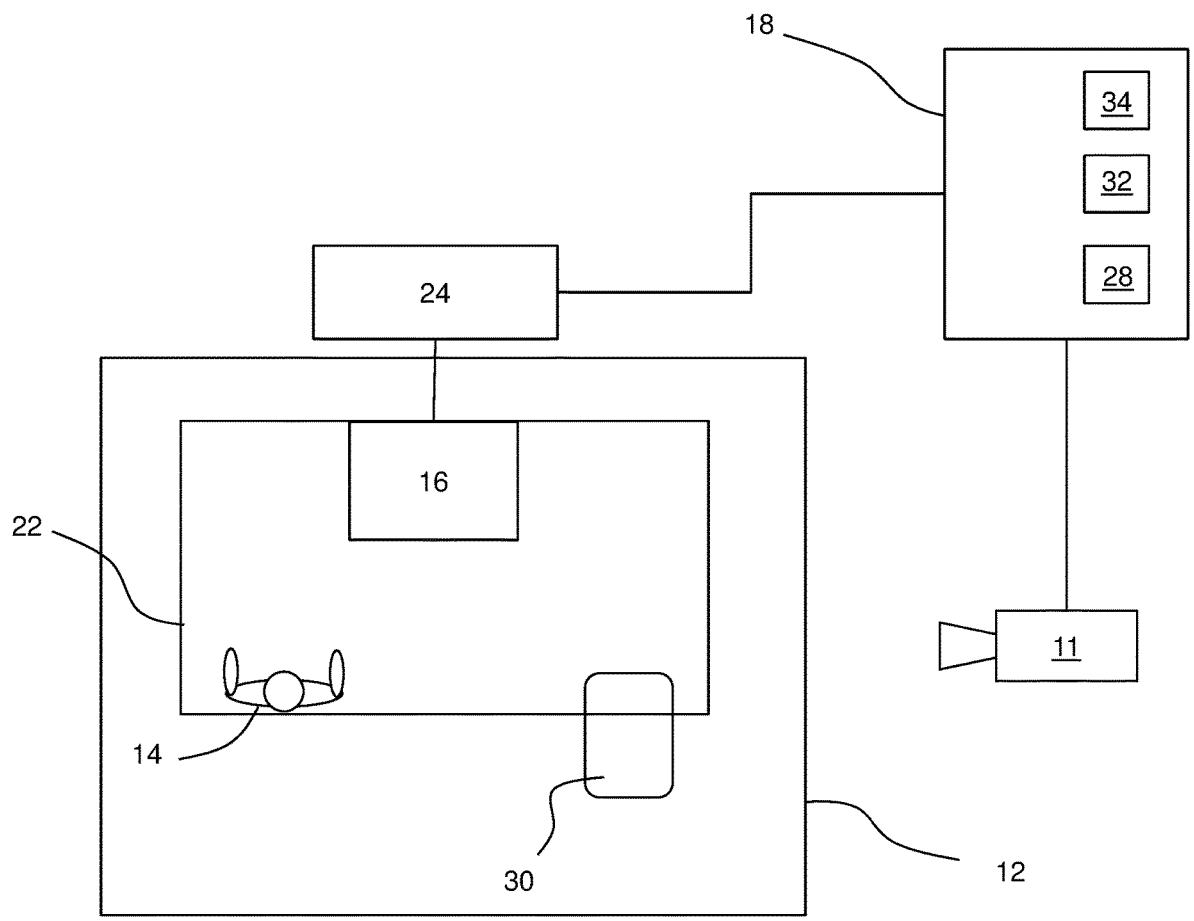

FIG. 3 a schematic representation of the monitoring in a different situation.

FIG. 1 shows in a schematic three-dimensional representation the general setup of a sensor arrangement 10 in accordance with the invention with a 3D camera for recording a depth map in a typical monitoring system. At least one 3D camera 11 continuously detects objects 14 and 16 in its field of vision 12 and generates 3D images of the field of vision 12. Various technologies are known for a 3D camera such as time of flight principle with a direct time of flight measurement of light signals or a phase measurement or a distance estimate from brightness levels or focal positions (depth from focus, depth from defocus) or a triangulation principle in which two camera images of a moving camera or of a stereo camera are correlated with one another or alternatively an illumination pattern is correlated with a camera image to thus estimate disparities and to determine distances therefrom. The 3D camera 11 is preferably configured as failsafe, that is, it is designed for a safety engineering application and satisfies the standards named in the introduction or corresponding standards to safeguard a hazardous machine.

A control and evaluation unit 18 evaluates the 3D images and determines the positions of the detected objects 14 and 16, in particular from the received signal of a light receiver 20 of the 3D camera 11. The control and evaluation unit 18 can be implemented in the most varied hardware, for example digital modules such as microprocessors, ASICS (application specific integrated circuits), FPGAs (field programmable gate arrays), GPUs (graphics processing units) or mixed forms thereof that can preferably be located in the 3D camera 11, but that can also be distributed over any desired internal and external components, with external components also being able to be integrated via a network or cloud provided that latencies can be managed or tolerated. Since a 3D evaluation, that is the generation of the depth map and its evaluation, is very processor intensive, an at least partly parallel architecture is preferably formed.

A monitored zone 22 is defined within the field of vision 12 and, for example a person, an object 14 here, may not be present therein because otherwise the person 14 would come too close to the hazard site, that is the machine 16. If the person 14 nevertheless enters the monitored zone 22, the instantaneous position is evaluated as dangerous and a safety-directed response of the machine 16 is initiated via a machine control 24. For this purpose, the control and evaluation unit 18 has a safety output 26 via which a safety signal can be conducted to the machine control 24.

The control and evaluation unit 18 here designates analog circuits or digital evaluation modules of the 3D camera 11 itself or of other devices of the sensor arrangement. A minimal configuration of the sensor arrangement is accordingly a single 3D camera having an internal control and evaluation unit such as is schematically shown in FIG. 1.

The heart of the invention is a restart function after a triggering of a safety-directed response of the machine 16, for example a shutdown. A buffer memory unit 28 is provided for this purpose, in the control and evaluation unit 18, for example. A specific number N of the last recorded 3D images is continuously stored in the buffer memory unit 28 in ongoing operation. The buffer memory unit 28 can be configured, for example, in the manner of a ring memory.

If the safety directed response was initiated because an unpermitted object, for example a person 14, was detected in the monitored zone 22, as indicated in FIG. 2, a 3D reference map of the monitored zone 22 is prepared from the stored N images in the control and evaluation unit 18. The situation is thus recorded so-to-say directly before the safety-directed shutdown. That is the configuration such as is shown in FIG. 2. In this case, a part of a permitted object 30, for example a pallet loaded with material, is also still in the monitored zone 22. The variable N is preferably equal to 10 or more. This is a sensible compromise between a fast storage of as few images as possible and an accuracy of the reference map due to as many images as possible.

After the shutdown, 3D images are further continuously recorded by the 3D camera 11. These new 3D images are further processed together with the reference map in a voxel identification unit 32 and those voxels are identified or flagged whose coordinates differ by a specified distance from those of the corresponding voxels of the reference map.

FIG. 3 is intended to show the situation of FIG. 2 at a somewhat later time. Only the position of the person 1 has changed in the monitored zone 22 between the time of the shutdown (FIG. 2) and the later time (FIG. 3). This object 14, or rather the part regions of this object that are disposed in the monitored zone 22, are therefore identified in the voxel identification unit 32 because their positions have changed after the safety-directed response. All the other regions or objects in the monitored zone are static and thus permitted in the monitored zone because they have not led to the safety-directed response.

In a movement recognition unit 34, the previously identified voxels are then examined as to whether they display position changes that are above a fixed threshold in the course of a fixed number of further current images. It is therefore thus determined whether the objects or at least part regions of the objects 14 move. A distinction between static objects 30 and persons 14 thus becomes possible. This is therefore a person recognition. This works because a person cannot remain static. Even if the person in the monitored zone falls and remains lying "motionless", smaller movements will nevertheless occur simply by breathing that the sensor arrangement in accordance with the invention identifies. The threshold for the recognition of a movement is preferably at 10 mm. Movements are thus recognized that amount to a least a position change of 10 mm.

If it is found that a person 14 is or at least part regions of this person 14 or is/are not is is/are no longer present in the monitored zone, the machine 16 can be restarted without risk. A restart signal for the machine 16 is then output at an output 28. The machine control 24 then causes the machine 16 to restart.

In addition to the restart signal, in a further development of the invention, a person recognition signal can be output if the movement recognition unit 34 has recognized a person, that is has recognized movements that are above the fixed threshold.

The buffer memory unit 28, the voxel identification unit 32, and the movement recognition unit 34 are preferably parts of the control and evaluation unit 18. This not only shortens the signal distances, but also increases the compactness. The control and evaluation unit 18 can be integrated in the 3D camera for a further increase in compactness.

A splitting of the units over a separate safety control and the 3D camera is possible, as presented in the introduction.

In an embodiment of the invention, the sensor arrangement 10 comprises an additional sensor, in particular a radar sensor, that only detects movements of objects in the monitored zone 22. The functional safety, which is synonymous with movement safety, can thereby be increased because a radar sensor having a different measurement technology, that is diversely redundant, likewise carries out a movement recognition.

All the components of the sensor arrangement 10, and in particular the control and evaluation unit 18 with the buffer memory unit 28, the voxel identification unit 32, and the movement recognition unit 34, are preferably configured as failsafe.

The invention claimed is:

1. A sensor arrangement for safeguarding a monitored zone at a machine that defines a hazard site, the sensor arrangement comprising
    at least one camera configured to continuously generate 3D images for the detection of objects in the monitored zone;
    a control and evaluation unit configured to determine the presence or position of detected objects in the monitored zone and to initiate a safety-directed response of the machine in the case of a hazardous position;
    a buffer memory unit configured to store the generated 3D images therein;
    the control and evaluation unit is configured to prepare a 3D reference map from the stored 3D images when the safety-directed response has been initiated;
    a voxel identification unit configured to flag voxels in a current 3D image, from among the 3D images generated continuously after the safety-directed response has been initiated, whose coordinates differ by a specified distance from coordinates of corresponding voxels of the 3D reference map; and
    a movement recognition unit in which the flagged voxels are examined to determine whether they display a position change in the 3D images generated continuously after the safety-directed response has been initiated that is above a fixed threshold value; and
    wherein the control and evaluation unit is configured to output a restart signal for the machine in response to the movement recognition unit determining that the position change is equal to or below the fixed threshold value.

2. The sensor arrangement in accordance with claim 1, wherein the fixed threshold value is 10 mm.

3. The sensor arrangement in accordance with claim 1, wherein the control and evaluation unit is configured to output a person recognition signal when the position change is determined to be greater than the fixed threshold value.

4. The sensor arrangement in accordance with claim 1, wherein absolute values of position changes of an identified voxel from image to image are summed in the movement recognition unit, wherein the fixed threshold value is a fixedly stored voxel threshold value, and wherein a movement recognition signal is output or the restart signal is suppressed if the sum of the absolute values of the position changes is above the fixedly stored voxel threshold value.

5. The sensor arrangement in accordance with claim 1, wherein absolute values of position changes of identified voxels from image to image are summed in the movement recognition unit, wherein the fixed threshold value is a fixedly stored sum threshold value, and wherein a movement recognition signal is output or the restart signal is suppressed if the sum of the absolute values of the position changes is above the fixedly stored sum threshold value.

6. The sensor arrangement in accordance with claim 1, wherein the 3D camera is configured to detect an additional optical feature that serves as an additional criterion for flagging the voxels in the voxel identification unit.

7. The sensor arrangement in accordance with claim 1, wherein the buffer memory unit, the voxel identification unit, and the movement recognition unit are parts of the control and evaluation unit.

8. The sensor arrangement in accordance with claim 1, that has a safety control in which at least a part of the control and evaluation unit is implemented.

9. The sensor arrangement in accordance with claim 1, further comprising an additional sensor that detects movements of objects in the monitored zone.

10. The sensor arrangement in accordance with claim 9, wherein the additional sensor is a radar sensor.

11. The sensor arrangement in accordance with claim 1, wherein the 3D camera is configured as failsafe according to safety standards.

12. The sensor arrangement in accordance with claim 1, wherein the control and evaluation unit is configured as failsafe.

13. The sensor arrangement in accordance with claim 1, wherein N images are stored in the buffer memory unit and the variable N is equal to 10 or more.

14. The sensor arrangement in accordance with claim 1, wherein the continuous detection of 3D images takes place in a fixed time pattern.

15. A method of safeguarding a monitored zone at a machine, the method comprising the steps of
    continuously generating 3D images with at least one camera for the detection of objects in the monitored zone;
    determining a position of the detected objects; and
    in the case of a hazardous position, initiating a safety-directed response of the machine;
    storing the generated 3D images in a buffer memory unit;
    preparing a 3D reference map from the stored 3D images when the safety-directed response has been initiated;
    flagging voxels in a current 3D image, from among the 3D images generated continuously after the safety-directed response has been initiated, whose coordinates differ by a specified distance from coordinates of corresponding voxels of the 3D reference map in a voxel identification unit;
    examining the flagged voxels in a movement recognition unit to determine whether they display a position change in the 3D images generated continuously after the safety-directed response has been initiated that is above a fixed threshold value; and
    outputting a restart signal for the machine at an output when the determined position change is are not above the fixed threshold.

* * * * *